US011863995B2

United States Patent
Chen et al.

(10) Patent No.: US 11,863,995 B2
(45) Date of Patent: Jan. 2, 2024

(54) METHOD FOR GENERATING WIRELESS ACCESS POINT INFORMATION, DEVICE, AND COMPUTER READABLE MEDIUM

(71) Applicant: SHANGHAI LIANSHANG NETWORK TECHNOLOGY CO., LTD., Shanghai (CN)

(72) Inventors: Shengfu Chen, Shanghai (CN); Ting Shan, Shanghai (CN); Chuanqi Liu, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 64 days.

(21) Appl. No.: 17/135,523

(22) Filed: Dec. 28, 2020

(65) Prior Publication Data

US 2021/0117713 A1    Apr. 22, 2021

Related U.S. Application Data

(63) Continuation of application No. PCT/CN2018/124525, filed on Dec. 27, 2018.

(30) Foreign Application Priority Data

Jun. 27, 2018 (CN) .......................... 201810677624.5

(51) Int. Cl.
*H04W 12/00* (2021.01)
*H04W 12/73* (2021.01)
(Continued)

(52) U.S. Cl.
CPC .......... *H04W 12/73* (2021.01); *G06F 18/214* (2023.01); *G06V 20/63* (2022.01); *G06V 30/153* (2022.01);
(Continued)

(58) Field of Classification Search
CPC .... G06V 30/153; G06V 10/267; G06V 30/10; G06V 20/63; G06K 9/6256;
(Continued)

(56) References Cited

U.S. PATENT DOCUMENTS

2011/0103688 A1* 5/2011 Urbschat ............ G06V 30/1914
382/182
2014/0022406 A1* 1/2014 Baheti ................ G06V 30/1478
348/222.1
(Continued)

FOREIGN PATENT DOCUMENTS

CN        106507356 A     3/2017
CN        106973425 A     7/2017
(Continued)

*Primary Examiner* — Neil R McLean
(74) *Attorney, Agent, or Firm* — Bayramoglu Law Offices LLC

(57) ABSTRACT

A wireless access point information generation method, a device, and a computer readable medium are provided. The method includes: extracting candidate character images from an obtained image, wherein the obtained image includes an image indicating a wireless access point; determining a character image in the extracted candidate character images; determining a recognition result of the determined character image by using a character-recognition model, wherein the character-recognition model is used for representing a correspondence between the character image and a character; and generating an access point identifier and a password of the wireless access point according to the determined recognition result. The method provides a manner of generating wireless access point information.

15 Claims, 7 Drawing Sheets

(51) Int. Cl.
*H04W 12/08* (2021.01)
*H04W 48/16* (2009.01)
*G06V 30/148* (2022.01)
*G06F 18/214* (2023.01)
*G06V 20/62* (2022.01)
*G06V 30/10* (2022.01)

(52) U.S. Cl.
CPC ........... *H04W 12/08* (2013.01); *H04W 48/16* (2013.01); *G06V 30/10* (2022.01)

(58) Field of Classification Search
CPC ..... H04W 12/08; H04W 48/16; H04W 12/65; H04W 12/73; H04L 63/20
USPC ......................................................... 382/186
See application file for complete search history.

(56) References Cited

U.S. PATENT DOCUMENTS

| | | | | |
|---|---|---|---|---|
| 2015/0006361 | A1* | 1/2015 | Kumar | G06T 17/00 |
| | | | | 705/39 |
| 2015/0149574 | A1* | 5/2015 | Shimomoto | G06F 21/606 |
| | | | | 709/206 |
| 2018/0150956 | A1* | 5/2018 | Kao | G06V 10/82 |

FOREIGN PATENT DOCUMENTS

| | | | |
|---|---|---|---|
| CN | 108112051 A | 6/2018 | |
| CN | 108875748 A | 11/2018 | |
| WO | WO-2018184410 A1 * | 10/2018 | ........... H04L 63/083 |

* cited by examiner

METHOD FOR GENERATING WIRELESS ACCESS POINT INFORMATION, DEVICE, AND COMPUTER READABLE MEDIUM

CROSS REFERENCE TO THE RELATED APPLICATIONS

This application is the continuation application of International Application No. PCT/CN2018/124525, filed on Dec. 27, 2018, which is based upon and claims priority to Chinese Patent Application No. 201810677624.5, filed on Jun. 27, 2018, the entire contents of which are incorporated herein by reference.

TECHNICAL FIELD

Embodiments of this application relate to the field of computer technologies, and in particular, to a wireless access point information generation method, a device, and a computer readable medium.

BACKGROUND

With the continuous development of wireless communication technologies, the wireless network has become an important manner for a user to access a network daily, and also brings great convenience to the user.

Currently, there are two main manners for users to connect to a wireless access point. In one manner, a user directly opens a wireless access list page provided by an operating system of a mobile terminal, and selects a wireless access point on the wireless access list page. If the selected wireless access point is a password-free wireless access point, the mobile terminal can directly connect to the wireless access point. If the selected wireless access point is an encrypted wireless access point, the mobile terminal can connect to the wireless access point only after the user enters a password of the wireless access point. In the other manner, a user opens a wireless access point application and operates on an interface of the wireless access point application for connection to a wireless access point.

SUMMARY

Embodiments of this application provide a wireless access point information generation method, a device, and a computer readable medium.

According to a first aspect, an embodiment of this application provides a wireless access point information generation method. The method includes: extracting candidate character images from an obtained image, where the image includes an image indicating a wireless access point (WAP); determining a character image in the extracted candidate character images; determining a recognition result of the determined character image by using a character-recognition model, where the character-recognition model is used for representing a correspondence between a character image and a character; and generating an access point identifier and a password of the wireless access point according to the determined recognition result.

According to a second aspect, an embodiment of this application provides a wireless access point information generation apparatus. The generation apparatus includes: an extraction unit, configured to extract candidate character images from an obtained image, where the image includes an image indicating a wireless access point; a first determining unit, configured to determine a character image in the extracted candidate character images; a second determining unit, configured to determine a recognition result of the determined character image by using a character-recognition model, where the character-recognition model is used for representing a correspondence between a character image and a character; and a generation unit configured to generate an access point identifier and a password of the wireless access point according to the determined recognition result.

According to a third aspect, an embodiment of this application provides an electronic device, including: one or more processors; and a storage apparatus, storing one or more programs, the one or more programs, when executed by the one or more processors, causing the one or more processors to implement the method according to any one of the implementations in the first aspect.

According to a fourth aspect, an embodiment of this application provides a computer readable medium, storing a computer program, the computer program, when executed by a processor, implementing the method according to any one of the implementations in the first aspect.

According to the wireless access point information generation method, the electronic device, and the computer readable medium provided in the embodiments of this application, candidate character images are extracted from an obtained image, where the image includes an image indicating a wireless access point; a character image is determined in the extracted candidate character images; a recognition result of the determined character image is determined by using a character-recognition model, where the character-recognition model is used for representing a correspondence between a character image and a character; and an access point identifier and a password of the wireless access point are generated according to the determined recognition result. Therefore, a manner of generating wireless access point information is provided.

BRIEF DESCRIPTION OF THE DRAWINGS

Other features, objectives, and advantages of this application become more obvious by reading the detailed description of non-limiting embodiments that is provided with reference to the following accompanying drawings.

DETAILED DESCRIPTION OF THE EMBODIMENTS

This application is further described in detail below with reference to the accompanying drawings and embodiments.

It may be understood that specific embodiments described herein are only used to explain a related invention, but not to limit the invention. In addition, it should be further noted that, for ease of description, the accompanying drawings only show parts relevant to the related invention.

It should be noted that the embodiments in this application and features in the embodiments can be combined with each other in the case of no conflict. This application is described in detail below with reference to the accompanying drawings and the embodiments.

Figure 1:
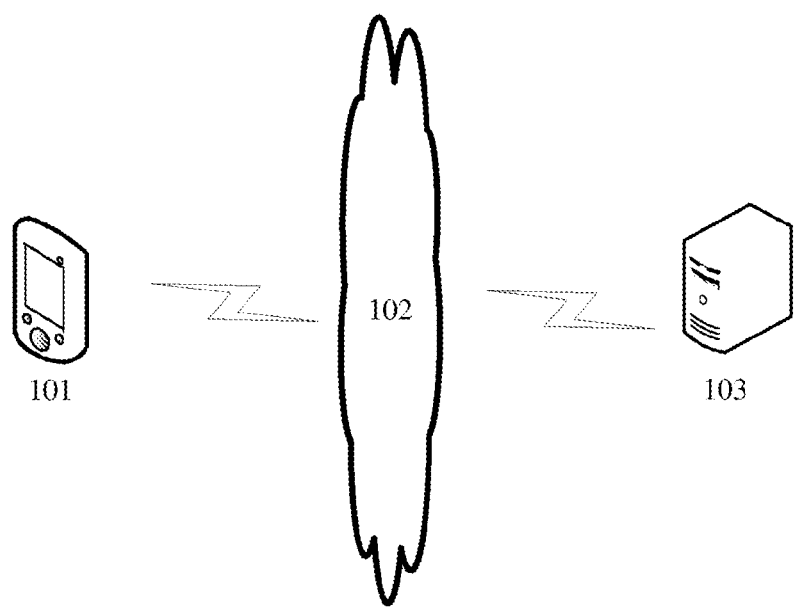
FIG. 1 is a diagram of an exemplary system architecture to which an embodiment of this application is applicable.

FIG. 1 shows an exemplary system architecture 100 to which a wireless network access point information generation method of this application is applicable.

As shown in FIG. 1, the system architecture 100 may include a network device 101, a network 102, and a network device 103. The network 102 is a medium used for providing a communication link between the network device 101 and the network device 103. The network 102 may include various connection types, for example, a wired or wireless communication link, or an optical fiber cable.

The network device 101 and the network device 103 each may be a hardware device or software that supports network connection to provide various network services. When the network device is hardware, the network device may be various electronic devices that support an instant messaging function, including but not limited to a smartphone, a tablet computer, a laptop computer, a desktop computer, a server, and the like. In this case, as a hardware device, the network device may be implemented as a distributed network device cluster including a plurality of network devices, or as a single network device. When the terminal device is software, the network device may be installed in the foregoing listed electronic devices. In this case, as software, the network device may be implemented as, for example, a plurality of pieces of software or a plurality of software modules for providing distributed services, or as a single piece of software or a single software module. This is not specifically limited herein.

In practice, the network device may provide a corresponding network service by installing a corresponding client application or server application. After the client application are installed in the network device, the client application may be embodied as a client in network communication. Correspondingly, after the server application is installed, the server application may be embodied as a server in network communication.

In an example, in FIG. 1, the network device 103 is embodied as a server, and the network device 101 is embodied as a client. Specifically, the network device 101 may be a client in which an instant messaging application, a wireless access point application, and an image acquisition application are installed. The network device 103 may be a back-end server with an instant messaging function and an image processing function.

It should be noted that the wireless network access point information generation method provided in this embodiment of this application may be performed by the network device 103 or the network device 101.

It should be understood that quantities of networks and network devices in FIG. 1 are only schematic. According to implementation requirements, there may be any quantity of networks and network devices.

Figure 2:
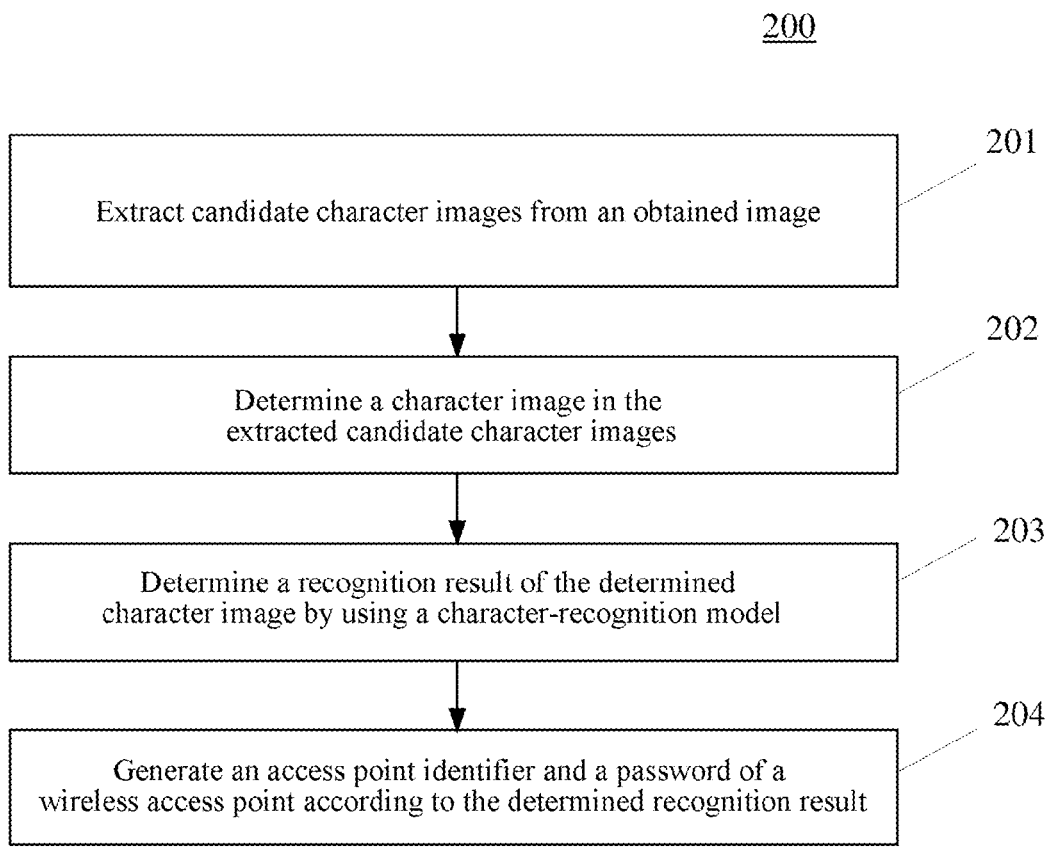
FIG. 2 is a flowchart of an embodiment of a wireless access point information generation method according to this application.

FIG. 2 shows a process 200 of an embodiment of a wireless access point information generation method. In this embodiment, an example that the method is applied to an electronic device with a certain computing capability is mainly used for description. The electronic device may be the terminal device 101 shown in FIG. 1, or the server 103 shown in FIG. 1. The wireless access point information generation method may include the following steps:

Step 201: Extract candidate character images from an obtained image.

In this embodiment, an execution body (for example, the terminal device shown in FIG. 1) of the wireless access point information generation method may extract the candidate character images from the obtained image.

In this embodiment, the obtained image may include an image indicating a wireless access point. The wireless access point information may include an access point identifier and/or a password of the wireless access point.

In this embodiment, the wireless access point may be an access point of a wireless network in various wireless connection manners. It should be noted that the foregoing wireless connection manners may include but are not limited to, 3G/4G connection, WiFi connection, Bluetooth connection, WiMAX connection, Zigbee connection, ultra wideband (UWB) connection, and other existing or to-be-developed wireless connection manners.

In some optional implementations of this embodiment, prompt information may be in the form of characters. In an example, the prompt information may include, but is not limited to, access point identifier prompt information and password prompt information. The access point identifier prompt information may include, but is not limited to, the following characters: WiFi, WIFI, SSID, User, user, Account number, Access point identifier, Name, User name, and the like. The password prompt information may include, but is not limited to, the following characters: Security code, Encryption key, PASSWORD, Password, and the like.

In some optional implementations of this embodiment, the prompt information may be alternatively in the form of drawings. In an example, a target image may be an image of an icon of the wireless network access point.

Generally, a user may use a terminal device to obtain an image of a carrier in reality that records wireless access point information. The wireless access point information may include an access point identifier and/or a password of a wireless access point. For example, the wireless access point information is written on a piece of paper pasted on a wall. The user may obtain an image of the pasted paper by using the terminal and determine the image of the pasted paper obtained by the terminal as an obtained image.

Optionally, whether the image includes the image indicating the wireless access point may be determined in advance before step 201 is performed. If the image indicating the wireless access point is included, the image indicating the wireless access point is stored to ensure that the image obtained by the foregoing execution body includes the image indicating the wireless access point.

Generally, if the image includes the image indicating the wireless access point, the image records connection manner information. The connection manner information may indicate a connection manner for connecting to a wireless access point. The connection manner information is generally embodied as a character image. Therefore, if the obtained image includes the foregoing target image, it may be considered that the foregoing image includes a character image.

In this embodiment, characters included in the foregoing character image may include, but are not limited to the following cases: "Access point identifier: 123; Password: 321"; "Access point identifier: 123; No password"; "Signal strongest; No password"; and "Signal strongest; No password".

Optionally, the obtained image may include a character image of the access point identifier and/or the password of the wireless access point.

It may be understood that the wireless access point information may include an access point identifier and a password, which is the most common way; or may include an access point identifier but not a password, which, in an example, may be applicable to a case in which no password is set for a wireless access point; or may include a password but not an access point identifier, which, in an example, may be applicable to a case of no interference from other wireless access points in the surrounding environment.

In this embodiment, the character image may be a handwritten image, or a printed image, which is not limited herein.

In this embodiment, there may be one or more extracted candidate character images. The candidate character image may indicate one or more characters.

In this embodiment, the candidate character image may be a suspect image indicating a character. The candidate character image may indicate a character, or may indicate a non-character.

In an example, the character may include, but is not limited to, various words (for example, Chinese, English, and Japanese), a number, an underline, and a punctuation.

In this embodiment, step 201 may be implemented in various manners.

In some optional implementations of this embodiment, a position detection model may be established by using a convolutional neural network. Positions of the character images in the obtained image are determined by using the position detection model. Then the images whose positions are determined are used as the candidate character images.

In some optional implementations of this embodiment, the obtained image may be binarized to extract the candidate character images from the obtained image.

In some optional implementations of this embodiment, step 201 may be implemented in a manner of maximally stable extremal regions (MSER). The general principle may be as follows: A plurality of gray thresholds are used to binarize the obtained image. A corresponding black region and white region are obtained for each binary image obtained by using each gray threshold. An image with independent and disconnected regions (usually background regions are connected and character image regions are disconnected) may be selected, as the candidate character image, from images with regions whose shapes remain stable in a relative wide range of gray thresholds.

Step 202: Determine a character image in the extracted candidate character images.

In this embodiment, an execution body (for example, the terminal device shown in FIG. 1) of the wireless access point information generation method may determine the character image in the extracted candidate character images.

In this embodiment, the determined character image may be an image indicating a character.

In this embodiment, step 202 may be implemented in various manners.

In an example, a character image template set may be set. The candidate character image is compared with a character image template in the character image template set. If in the character image target set, there is a character image template matching the candidate character image, the candidate character image may be determined as the character image. If in the character image target set, there is no character image template matching the candidate character image, the candidate character image may be determined as a non-character image.

Step 203: Determine a recognition result of the determined character image by using a character-recognition model.

In this embodiment, an execution body (for example, the server shown in FIG. 1) of the wireless access point information generation method may determine the recognition result of the determined character image by using the character-recognition model.

Herein, the recognition result may be a character indicated by the determined character image.

Herein, the character-recognition model may be used for representing a correspondence between a character image and a character.

In some embodiments, the character-recognition model may be a correspondence table. Herein, the correspondence table may be used for representing a correspondence between a character image and a character. In an example, the foregoing execution body may compare the received character image with a character image in the correspondence table to find a matched character image, and use a character corresponding to the matched character image as a character of the received character image.

In some embodiments, the character-recognition model may be obtained in the following steps: obtaining a training sample set, where a training sample may include a training character image with characters being marked; and training an original model by using the training sample set to obtain the character-recognition model. The original model may be any of various models untrained or models training of which are not completed. In an example, the original model may include, but is not limited to, a decision tree, a convolutional neural network, and the like.

In this embodiment, the determined character image may be imported into the character-recognition model. The foregoing recognition result is determined according to characters outputted by the character-recognition model.

In this embodiment, the recognition result of the determined character image may be determined by using one or more character-recognition models.

In an example, the determined character image may be imported into one character-recognition model, and characters outputted by the character-recognition model are determined as the foregoing recognition result.

In an example, the determined character image may be imported into at least two character-recognition models, and characters outputted by the character-recognition models are determined as the foregoing recognition result.

It may be understood that, there may be one or more determined character images. Each determined character image may correspond to a recognition result of the character image. If the character image indicates a plurality of characters, the recognition result may include a plurality of characters; and if the character image indicates one character, the recognition result may include one character.

Step 204: Generate the access point identifier and the password of the wireless access point according to the determined recognition result.

In this embodiment, an execution body (for example, the server shown in FIG. 1) of the wireless access point information generation method may generate the access point identifier and/or the password of the wireless access point according to the recognition result.

In this embodiment, step 204 may be implemented in various manners.

In an example, step 204 may be implemented in the following manner: comparing the determined recognition result with an access point identifier in an access point identifier set, and determining a recognition result with a matched access point identifier as the access point identifier, and determining a recognition result without a matched access point identifier as the password.

It should be noted that the execution body of this embodiment of this application may be a terminal device, or a server.

In an example, in a case that the terminal device has a capability of communicating with the server (for example, the terminal device may communicate with the server by using traffic of the terminal device), the terminal device may send a photographed image to the server. The server performs the foregoing step 201, step 202, step 203, and step 204, and then returns the access point identifier and the password determined in step 204 to the terminal device.

Figure 3:
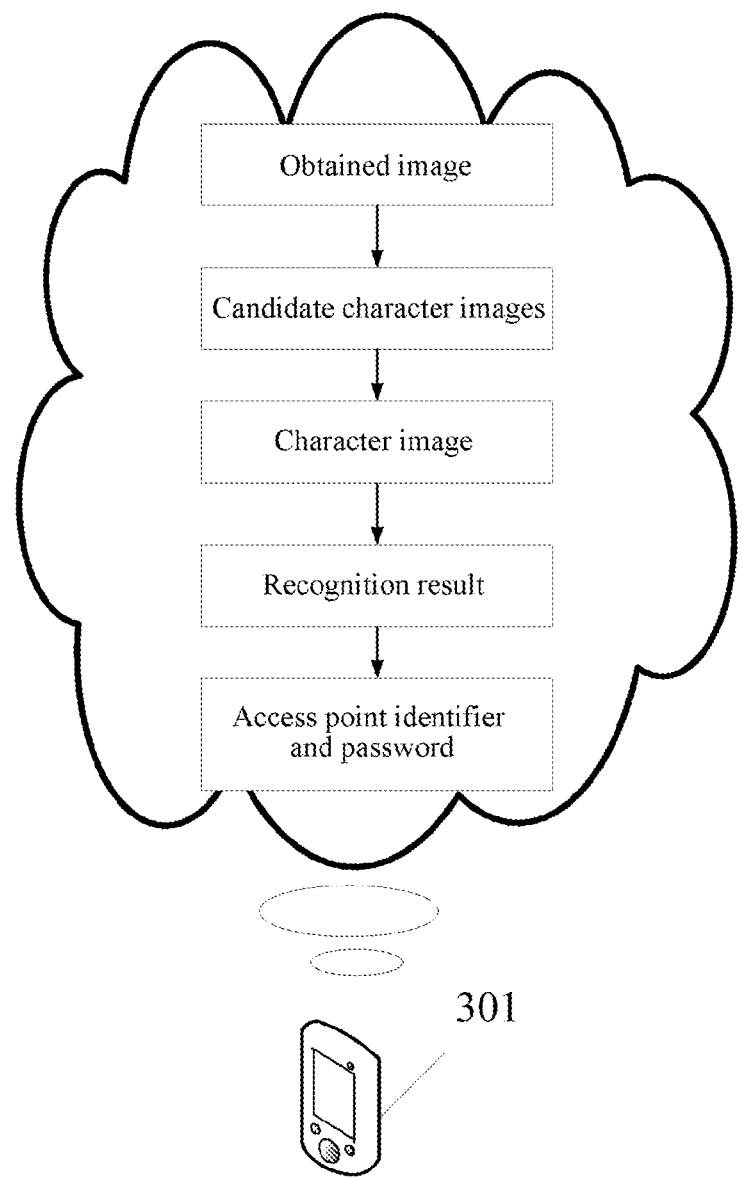
FIG. 3 is a schematic diagram of an application scenario of a wireless access point information generation method according to this application.

FIG. 3 is a schematic diagram of an application scenario of a wireless access point information generation method according to an embodiment. In the application scenario in FIG. 3:

A user may use a terminal device 301 to photograph or scan a piece of paper pasted on a wall. "Account number: 123; Password: 321" is written on the paper.

The terminal device 301 may extract candidate character images from an obtained image. For example, a first candidate character image indicates "Account number: 123", a second candidate character image indicates "Password: 321", and a third candidate character image indicates disordered non-characters such as "* . . . ".

The terminal device 301 may determine character images in the extracted candidate character images. For example, the character image indicating "Account number: 123" is determined, and the character image indicating "Password: 321" is determined.

The terminal device 301 may determine recognition results by using a character-recognition model. For example, the recognition results may be "Account number: 123" and "Password: 321".

The terminal device 301 may generate an access point identifier (for example, "123") and a password (for example, "321") of a wireless access point according to the recognition results.

In the method provided in the foregoing embodiment of this application, candidate character images are extracted first, a character image is determined in the candidate character images, a recognition result is determined by using a character-recognition model, and an access point identifier and a password of a wireless access point are generated according to the recognition result. The technical effects may include at least the following effects:

First, a wireless access point information generation method is provided.

Second, an access point identifier and a password of a wireless access point are generated according to a character image in an image. Therefore, a mode for determining wireless access point information based on an image is provided.

Third, the foregoing execution body generates the access point identifier and the password of the wireless access point. As long as a user obtains an image by using a terminal, the wireless access point information can be automatically generated by using the method provided in this embodiment, and then the wireless access point can be automatically connected to.

Fourth, steps of extracting candidate character images first and determining a character image in the extracted candidate character images may be used as pre-processing steps to clear non-character images. The character-recognition model is used to determine a calculation amount of the recognition result.

Fifth, the recognition result may be determined by using the character-recognition model, so that a machine can automatically determine a recognition result, thereby improving the efficiency of character recognition.

Figure 4:
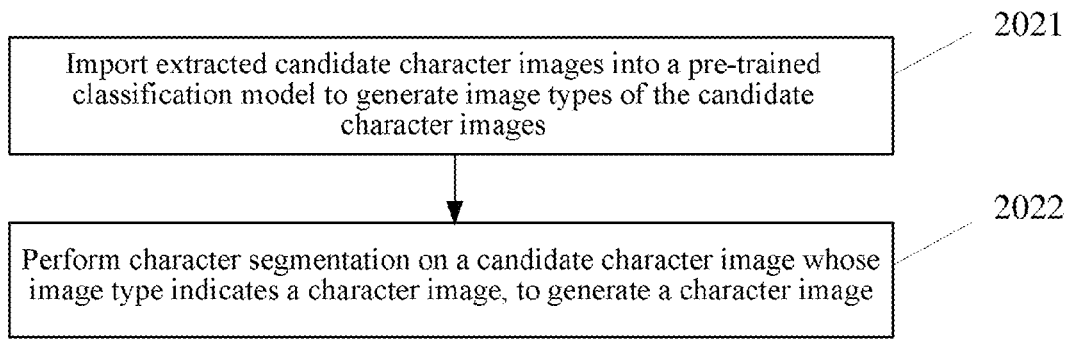
FIG. 4 is a schematic diagram of an optional implementation of step 202 according to this application.

In some optional implementations of this embodiment, step 202 may be implemented through a process 202 shown in FIG. 4. The process 202 may include the following steps:

Step 2021: Import the extracted candidate character images into a pre-trained classification model to generate image types of the candidate character images.

Herein, the image type may be used for indicating a character image or a non-character image.

Herein, the classification model may be used for representing a correspondence between a candidate character image and an image type. The classification model may be a binary classification model.

In some embodiments, the classification model may be a correspondence table. Herein, the correspondence table may be used for representing a correspondence between a candidate character image and an image type. In an example, the foregoing execution body may compare the received character image with a character image in the correspondence table to find a matched character image, and use an image type corresponding to the matched character image as an image type of the received character image.

In some embodiments, the classification model may be obtained in the following steps: obtaining a training sample set, where a training sample may include a training image with the image type being marked; and training an original model by using the training sample set to obtain the classification model. The original model may be any of various models untrained or models training of which are not completed. In an example, the original model may include, but is not limited to, a decision tree, a convolutional neural network, a recurrent neural network, and the like.

Step 2022: Perform character segmentation on a candidate character image whose image type indicates a character image, to generate a character image.

Figure 5:
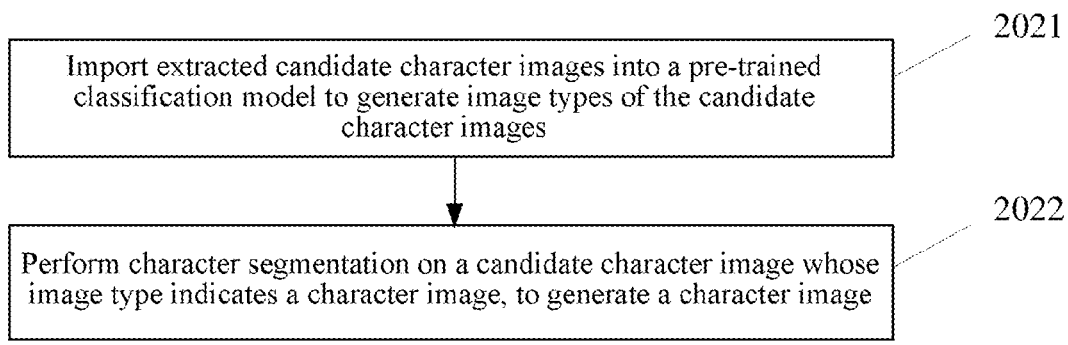
FIG. 5 is a schematic diagram of an optional implementation of step 2022 according to this application.

Herein, the character segmentation may be implemented in various manners. In an example, character segmentation may be performed in at least one of the following manners: a fixed-distance approach, a projection-based approach, and a connected domain analysis approach.

optionally, step 2022 may be implemented through a process 2022 shown in FIG. 5. The process 2022 may include the following steps:

Step 20221: Determine a character string image.

Herein, the character string image includes the candidate character image whose image type indicates the character image.

Herein, one or more character string images may be determined.

It should be noted that the character string image may indicate a sense group. In an example, a set of character images of an access point identifier may be determined as a character string image; and a set of character images of a password may be determined as a character string image. Generally, the character images of the access point identifier are in the same row or in the same column. The access point identifier may be extracted by determining the row or column in which the character images of the access point identifier are located. Generally, the character images of the password are in the same row or in the same column. The password may be extracted by determining the row or column in which the character images of the password are located.

Herein, the character string image may be determined by using a run length smoothing algorithm. The general principle is as follows: a pixel value of the candidate character image whose image type indicates the character image is determined as 0 (a pixel with a pixel value equal to 0 may be abbreviated as a black pixel), and a pixel value at another position of the obtained image is determined as 1 (a pixel with a pixel value equal to 1 may be abbreviated as a white pixel). A distance between black pixel points in the same row or column is detected. When a blank run length between two adjacent black pixel points is less than a threshold, the entire blank run between the two points is filled with black. An image in a region of each black pixel block in the obtained image may be determined as a character string image.

Step 20222: Perform skew correction on the character string image.

Herein, the skew correction may be performed on the character string image in various manners. For example, a projection-based approach and cluster-based approach. The projection-based approach is to perform projections from different perspectives on a text image, and select an optimal projection result from a series of obtained results, so as to estimate a skew angle of the text.

Herein, the skew correction may be performed on the character string image by using Hough Transform. The general process is as follows: straight line features of the character string image are determined by using Hough Transform; the skew angle of the character string image is determined according to the straight line features; and the character string image is rotated according to the determined skew angle, to complete skew correction on the character string image.

It should be noted that the principle of Hough Transform is to map target points in a Cartesian coordinate system into a polar coordinate system for accumulation, that is, all points of any straight line on a plane of the Cartesian coordinate system are mapped onto the same point of the polar coordinate system, and the straight line features are found by determining a peak value of a point set. Therefore, Hough Transform can determine image features of a suspect straight line in case of an intermittent straight line. Therefore, using Hough Transform to perform skew correction on a character string image can improve the robustness of straight line detection, and further improve the correctness of skew angle detection.

Step 20223: Perform character segmentation on the character string image, to generate a character image.

Herein, the character string image on which character segmentation is performed may experience the skew correction.

It should be noted that, the process 2022 may alternatively not include step 20222. In this case, the character string image on which character segmentation is performed may alternatively not experience the skew correction.

Herein, the character segmentation may be implemented in various manners. In an example, character segmentation may be performed in at least one of the following manners: a fixed-distance approach, a projection-based approach, and a connected domain analysis approach.

Generally, the wireless access point information provides specific prompt information to make a user expecting to access a wireless network understand what is an access point identifier and what is a password. The prompt information may include, but is not limited to, access point identifier prompt information and password prompt information. The access point identifier prompt information may include, but is not limited to, the following characters: WiFi, WIFI, SSID, User, user, Account number, Access point identifier, Name, User name, and the like. The password prompt information may include, but is not limited to, the following characters: Security code, Encryption key, PASSWORD, Password, and the like.

In some optional implementations of this embodiment, the foregoing step 204 may include: determining the access point identifier prompt information in the determined recognition result; and determining the access point identifier of the wireless access point according to a recognition result of a character image that is in the same character string image as a character image indicating the access point identifier prompt information.

In an example, the recognition result of the character image that is in the same character string image as the character image indicating the access point identifier prompt information may be determined as a candidate access point identifier of the wireless access point.

Optionally, the candidate access point identifier may be determined as the access point identifier of the wireless access point.

Optionally, an access point identifier matching the candidate access point identifier may be determined in an access point identifier set; and the access point identifier matching the candidate access point identifier may be determined as the access point identifier of the wireless access point.

In some optional implementations of this embodiment, the foregoing step 204 may include: determining the password prompt information in the determined recognition result; and determining a recognition result of a character image that is in the same character string image as a character image indicating the password prompt information as the password of the wireless access point.

In some optional implementations of this embodiment, the method shown in this embodiment further includes: sending a connection request to the wireless access point by using the generated access point identifier and password.

Optionally, the foregoing execution body may directly associate the generated access point identifier and password with the connection request, and send the connection request.

Optionally, the execution body displays the determined access point identifier; and send the connection request to the wireless access point in response to receiving information about a confirming operation of a user aiming at the displayed access point identifier.

Figure 6:
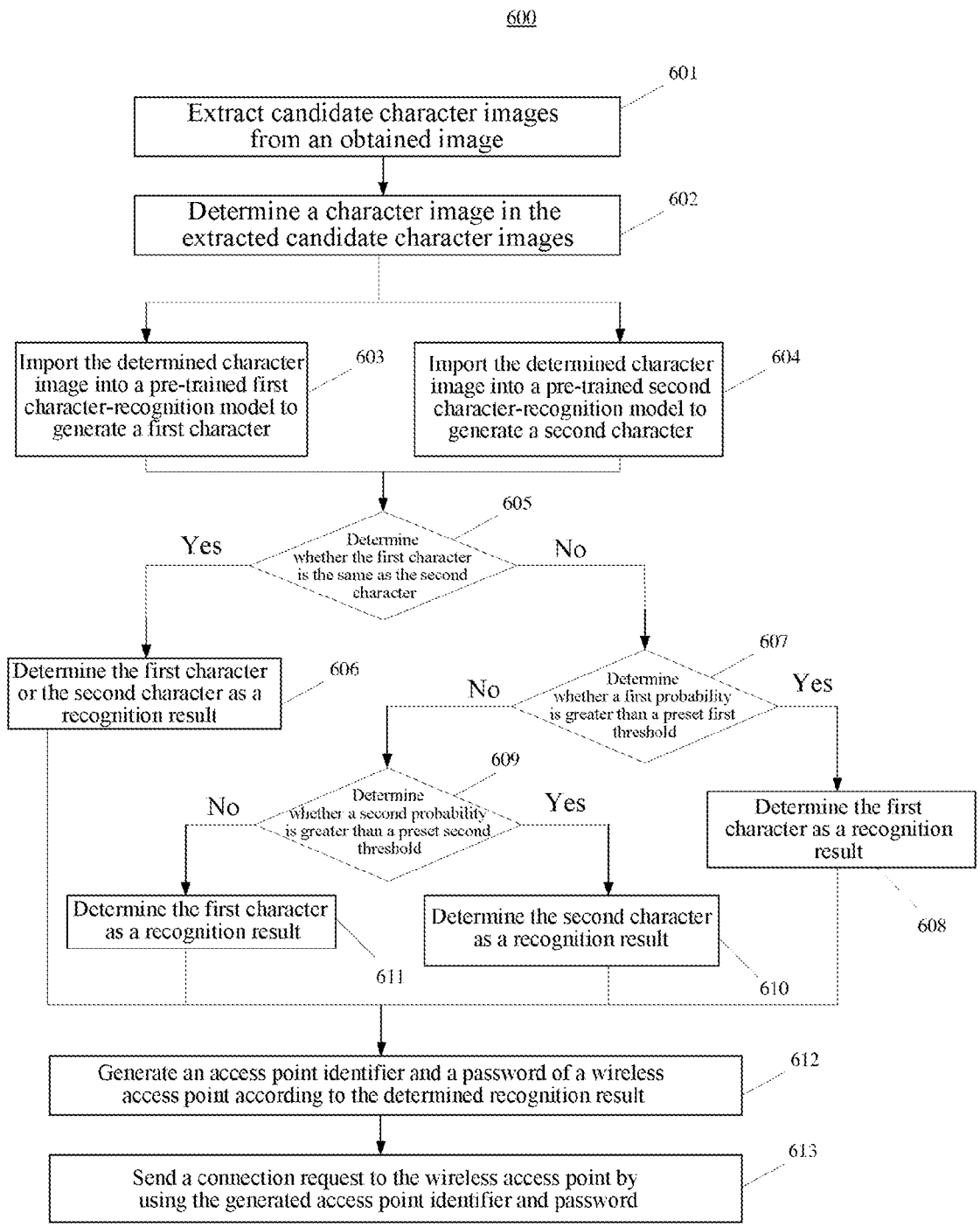
FIG. 6 is a flowchart of another embodiment of a wireless access point information generation method according to this application.

Further, FIG. 6 shows another process 600 of a wireless access point information generation method according to an embodiment of this application. The process 600 of the wireless access point information generation method includes the following steps:

Step 601: Extract candidate character images from an obtained image.

In this embodiment, an execution body (for example, the terminal device shown in FIG. 1) of the wireless access point information generation method may extract the candidate character images from the obtained image.

Step 602: Determine a character image in the extracted candidate character images.

In this embodiment, an execution body (for example, the terminal device shown in FIG. 1) of the wireless access point information generation method may determine the character image in the extracted candidate character images.

In this embodiment, specific operations of steps 601 and 602 are basically the same as the operations of steps 201 and 202 in the embodiment shown in FIG. 2. Details are not described herein again.

Step 603: Import the determined character image into a pre-trained first character-recognition model to generate a first character.

Herein, the first character is associated with a first probability, and the first probability is used for representing a probability that the determined character image indicates the first character.

In an example, the first character-recognition model may be established based on a convolutional neural network.

Step 604: Import the determined character image into a pre-trained second character-recognition model to generate a second character.

Herein, recognition accuracy of the second character-recognition model is less than recognition accuracy of the first character-recognition model.

Herein, the second character is associated with a second probability, and the second probability is used for representing a probability that the determined character image indicates the second character.

Step 605: Determine whether the first character is the same as the second character.

Step 606: Determine the first character or the second character as a recognition result in response to determining that the first character is the same as the second character.

Step 607: Determine whether the first probability is greater than a preset first threshold in response to determining that the first character is not the same as the second character.

Step 608: Determine the first character as the recognition result in response to determining that the first probability is greater than the first threshold.

Step 609: Determine whether the second probability is greater than a preset second threshold in response to determining that the first probability is not greater than the first threshold.

Step 610: Determine the second character as the recognition result in response to determining that the second probability is greater than the second threshold.

Step 611: Determine the first character as the recognition result in response to determining that the second probability is greater than the second threshold.

Step 612: Generate an access point identifier and a password of a wireless access point according to the determined recognition result.

In this embodiment, an execution body (for example, the terminal device shown in FIG. 1) of the wireless access point information generation method may generate the access point identifier and the password of the wireless access point according to the determined recognition result.

In this embodiment, specific operations of step 612 are basically the same as the operations of step 204 in the embodiment shown in FIG. 2. Details are not described herein again.

Step 613: Send a connection request to the wireless access point by using the generated access point identifier and password.

In this embodiment, an execution body (for example, the terminal device shown in FIG. 1) of the wireless access point information generation method may send the connection request to the wireless access point by using the generated access point identifier and password.

It can be seen from FIG. 6 that compared with the embodiment corresponding to FIG. 2, the process 600 of the wireless access point information generation method in this embodiment highlights the steps of determining the recognition result by using the two character-recognition models, and sending the connection request to the wireless access point by using the generated access point identifier and password. Therefore, the technical effects of the solution described in this embodiment may include at least the following effects:

First, a new wireless access point information generation method is provided.

Second, a new method for connecting to a wireless access point is provided.

Third, through two character-recognition models, outputs of the two character-recognition models can be fused to determine a more accurate recognition result. Further, the accuracy of the generated wireless access point information can be improved.

Figure 7:
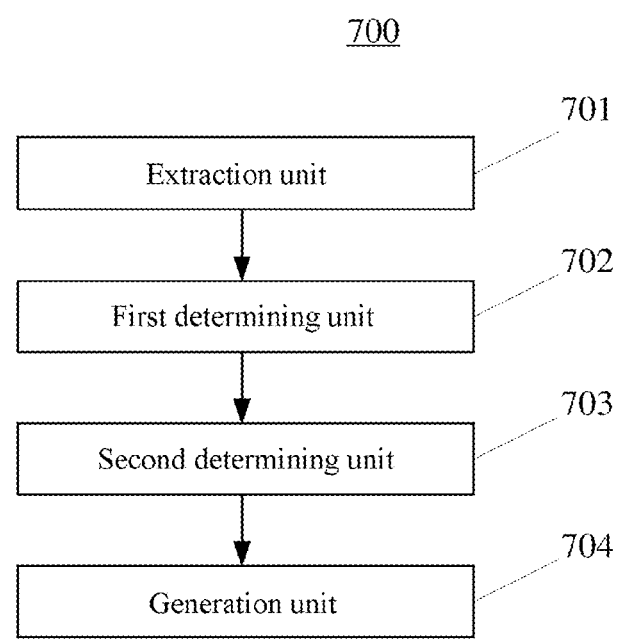
FIG. 7 is a schematic structural diagram of an embodiment of a wireless access point information generation apparatus according to this application.

Further referring to FIG. 7, in an implementation of the method shown in the foregoing figures, this application provides an embodiment of a wireless access point information generation apparatus. The apparatus embodiment corresponds to the method embodiment shown in FIG. 2. This apparatus is specifically applicable to various electronic devices.

As shown in FIG. 7, a wireless access point information generation apparatus 700 provided in this embodiment includes an extraction unit 701, a first determining unit 702, a second determining unit 703, and a generation unit 704. The extraction unit is configured to extract candidate character images from an obtained image, where the image includes an image indicating a wireless access point; the first determining unit is configured to determine a character image in the extracted candidate character images; the second determining unit is configured to determine a recognition result of the determined character image by using a character-recognition model, where the character-recognition model is used for representing a correspondence between a character image and a character; and the generation unit is configured to generate an access point identifier and a password of the wireless access point according to the determined recognition result.

In this embodiment, for specific processing and technical effects brought by the extraction unit 701, first determining unit 702, second determining unit 703, and generation unit 704 of the generation apparatus 700 for generating wireless access point information, reference may be respectively made to relevant description of steps 201, 202, 203, and 204 of the corresponding embodiment in FIG. 2. Details are not repeated herein.

In some optional implementations of this embodiment, a sending unit (not shown): is configured to send a connection request to the wireless access point by using the generated access point identifier and password.

In some optional implementations of this embodiment, the second determining unit is further configured to import the determined character image into at least two character-recognition models; and determine the foregoing recognition result according to characters outputted by the character-recognition models.

In some optional implementations of this embodiment, the second determining unit is further configured to import the determined character image into a pre-trained first character-recognition model to generate a first character; and import the determined character image into a pre-trained second character-recognition model to generate a second character.

In some optional implementations of this embodiment, the second determining unit is further configured to determine the first character or the second character as the recognition result in response to determining that the first character is the same as the second character.

In some optional implementations of this embodiment, recognition accuracy of the second character-recognition model is less than recognition accuracy of the first character-recognition model, the first character is associated with a first probability, and the first probability is used for representing a probability that the determined character image indicates the first character. The second determining unit is further configured to determine whether the first probability is greater than a preset first threshold in response to determining that the first character is not the same as the second character; and determine the first character as the recognition result in response to determining that the first probability is greater than the first threshold.

In some optional implementations of this embodiment, the second character is associated with a second probability, and the second probability is used for representing a probability that the determined character image indicates the second character. The second determining unit is further configured to determine whether the second probability is greater than a preset second threshold in response to determining that the first probability is not greater than the first threshold, where the second threshold is greater than the first threshold; and determine the second character as the recognition result in response to determining that the second probability is greater than the second threshold.

In some optional implementations of this embodiment, the first determining unit is further configured to import the extracted candidate character images into a pre-trained classification model to generate image types of the candidate character images, where the image type is used for indicating a character image or a non-character image, and the classification model is used for representing a correspondence between an image and an image type; and perform character segmentation on a candidate character image whose image type indicates a character image, to generate a character image.

In some optional implementations of this embodiment, the first determining unit is further configured to determine a character string image, where the character string image includes the candidate character image whose image type indicates the character image.

In some optional implementations of this embodiment, the first determining unit is further configured to perform character segmentation on the determined character string image, to generate a character image.

In some optional implementations of this embodiment, the first determining unit is further configured to perform skew correction on the character string image.

In some optional implementations of this embodiment, the generation unit is further configured to determine the access point identifier prompt information in the determined recognition result; and determine the access point identifier of the wireless access point according to a recognition result of a character image that is in the same character string image as a character image indicating the access point identifier prompt information.

In some optional implementations of this embodiment, the generation unit is further configured to determine the recognition result of the character image that is in the same character string image as the character image indicating the access point identifier prompt information as a candidate access point identifier of the wireless access point; determine, in an access point identifier set, an access point identifier matching the candidate access point identifier; and determine the access point identifier matching the candidate access point identifier as the access point identifier of the wireless access point.

In some optional implementations of this embodiment, the generation unit is further configured to determine the password prompt information in the determined recognition result; and determine a recognition result of a character image that is in the same character string image as a character image indicating the password prompt information as the password of the wireless access point.

It should be noted that for implementation details and technical effects of each unit of the wireless access point information generation apparatus provided in this embodiment of this application, reference may be made to description of other embodiments of this application. Details are not repeated herein.

Figure 8:
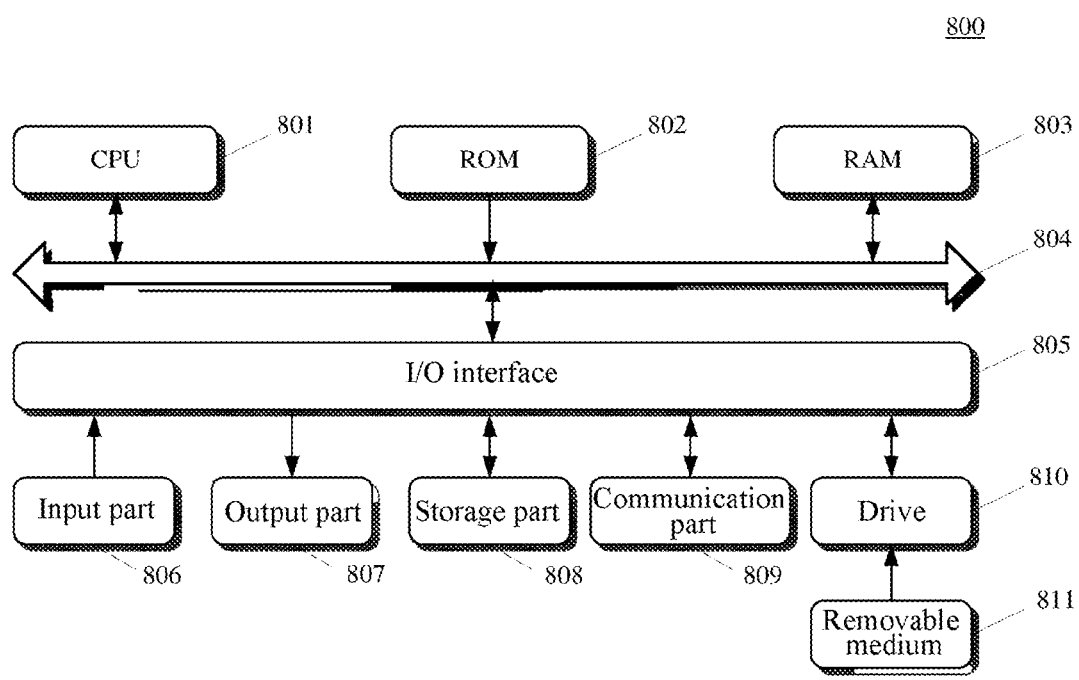
FIG. 8 is a schematic structural diagram of a computer system suitable for implementing a terminal device or a server according to an embodiment of this application.

FIG. 8 is a schematic structural diagram of a computer system 800 adapted to implement a terminal device or a server according to an embodiment of this application. The terminal device or the server shown in FIG. 8 is merely an example, and should not impose any limitation on a function and use scope of the embodiments of this application.

As shown in FIG. 8, the computer system 800 includes a central processing unit (CPU) 801. The CPU 801 may perform various proper actions and processing according to a program stored in a read-only memory (ROM) 802 or a program loaded from a storage part 808 into a random access memory (RAM) 803. The RAM 803 further stores various programs and data required for operations of the system 800. The CPU 801, the ROM 802, and the RAM 803 are connected to each other through a bus 804. An input/output (I/O) interface 805 is also connected to the bus 804.

The following components are connected to the I/O interface 805: an input part 806 including a keyboard, a mouse, or the like, an output part 807 including a cathode ray tube (CRT), a liquid crystal display (LCD), a speaker, or the like, a storage part 808 including a hard disk, or the like, and a communication part 809 including a network interface card such as a local area network (LAN) card or a modem. The communication part 809 performs a communication processing through a network such as the Internet. A drive 810 is also connected to the I/O interface 805 as required. A removable medium 811, such as a magnetic disk, an optical disc, a magneto-optical disk, or a semiconductor memory, is installed on the drive 810 as required, so that a computer program read from the removable medium is installed into the storage part 808 as required.

In particular, according to the embodiments of this application, the processes described above with reference to the flowchart may be implemented as a computer software program. For example, the embodiments of this application include a computer program product, including a computer program carried on a computer readable medium. The computer program includes program code for performing the method shown in the flowchart. In such an embodiment, the computer program may be downloaded and installed through the communication part 809 from a network, and/or installed from the removable medium 811. When the computer program is executed by the CPU 801, the foregoing functions defined in the method of this application are performed.

It should be noted that, the computer readable medium shown in this application may be a computer-readable signal medium, a computer-readable storage medium, or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code contained in the computer readable medium may be transmitted by using any appropriate medium, including but not limited to: a wireless medium, a wire, an optical cable, RF, any suitable combination thereof, or the like.

One or more programming languages or any combination thereof may be used to write the computer program code used for performing the operations in this application. The programming languages include, but are not limited to an object oriented programming language such as Java, Smalltalk, C++, or the like and a conventional procedural programming language, such as the C programming language or a similar programming language. The program code may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a computer of a user through any type of network including a local area network (LAN) or a wide area network (WAN), or may be connected to an external computer (for example, through the Internet by using an Internet service provider).

The flowcharts and block diagrams in the accompanying drawings show architectures, functions, and operations that may be implemented for the system, the method, and the computer program product according to the embodiments of this application. In this regard, each block in the flowchart or the block diagram may represent a module, a program segment, or a part of code. The module, the program segment, or the part of the code includes one or more executable instructions for implementing a specified logical function. It should also be noted that, in some alternative implementations, functions marked in boxes may alternatively occur in a sequence different from that marked in the accompanying drawing. For example, two boxes shown in succession may be actually performed basically in parallel, and sometimes the two boxes may be performed in a reverse sequence. This depends on a related function. It should also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

Related units described in the embodiments of this application may be implemented in a software manner, or may be implemented in a hardware manner. The described units may be alternatively disposed in a processor. For example, the processor may be described as including an extraction unit, a first determining unit, a second determining unit, and a generation unit. Names of the units do not constitute a limitation on the units under certain circumstances. For example, the extraction unit may be alternatively described as "a unit configured to extract candidate character images from an obtained image".

According to another aspect, this application further provides a computer readable medium. The computer readable medium may be included in the apparatus described in the foregoing embodiments, or may exist alone and is not disposed in the apparatus. The foregoing computer readable medium carries one or more programs. The one or more programs, when executed by the apparatus, causes the apparatus to extract candidate character images from an obtained image, where the image includes an image indicating a wireless access point; determine a character image in the extracted candidate character images; determine a recognition result of the determined character image by using a character-recognition model, where the character-recognition model is used for representing a correspondence between a character image and a character; and generate an access point identifier and a password of the wireless access point according to the determined recognition result.

The foregoing descriptions are merely preferred embodiments of this application and descriptions of the technical principles used. A person skilled in the art should understand that the scope of this application is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in this application (but not limited thereto) are also included.

What is claimed is:

1. A wireless access point information generation method, comprising:
    extracting candidate character images from an obtained image;
    determining a character image in the candidate character images;
    determining a recognition result of the character image by using a character-recognition model, wherein the character-recognition model is used for representing a correspondence between the character image and a character;
    the recognition result comprises a first description indicating that a wireless access point having a strongest wireless signal and a second description indicating that no password is required; and generating an access point identifier and an empty password of the wireless access point according to the recognition result.

2. The generation method according to claim 1, wherein the step of determining the recognition result of the character image by using the character-recognition model comprises:

importing the character image into at least two character-recognition models; and determining the recognition result according to characters outputted by the at least two character-recognition models.

3. The generation method according to claim 2, wherein the step of importing the character image into the at least two character-recognition models comprises:

importing the character image into a pre-trained first character-recognition model to generate a first character; and importing the character image into a pre-trained second character-recognition model to generate a second character.

4. The generation method according to claim 3, wherein the step of determining the recognition result according to the characters outputted by the at least two character-recognition models comprises:

determining the first character or the second character as the recognition result in response to determining the first character is same as the second character.

5. The generation method according to claim 3, wherein a recognition accuracy of the pre-trained second character-recognition model is less than a recognition accuracy of the pre-trained first character-recognition model, wherein the first character is associated with a first probability, and the first probability is used for representing a probability that the character image indicates the first character; and the step of determining the recognition result according to the characters outputted by the at least two character-recognition models comprises:

determining whether the first probability is greater than a preset first threshold in response to determining the first character is not same as the second character; and determining the first character as the recognition result in response to determining the first probability is greater than the preset first threshold.

6. The generation method according to claim 5, wherein the second character is associated with a second probability, and the second probability is used for representing a probability that the character image indicates the second character; and the step of determining the recognition result according to the characters outputted by the at least two character-recognition models comprises:

determining whether the second probability is greater than a preset second threshold in response to determining the first probability is not greater than the preset first threshold, wherein the preset second threshold is greater than the preset first threshold; and determining the second character as the recognition result in response to determining the second probability is greater than the preset second threshold.

7. The generation method according to claim 1, further comprising:

sending a connection request to the wireless access point by using the access point identifier and the empty password.

8. The generation method according to claim 1, wherein the step of determining the character image in the candidate character images comprises:

importing the candidate character images into a pre-trained classification model to generate image types of the candidate character images, wherein an image type of the image types is used for indicating the character image or a non-character image, and the pre-trained classification model is used for representing a correspondence between the image and the image type;

performing a character segmentation on a candidate character image of the candidate character images, wherein the image type of the candidate character image indicates the character image, to generate the character image.

9. The generation method according to claim 8, wherein the step of performing the character segmentation on the candidate character image, wherein the image type of the candidate character image indicates the character image, to generate the character image comprises:

determining a character string image, wherein the character string image comprises the candidate character image, wherein the image type of the candidate character image indicates the character image; and performing the character segmentation on the character string image, to generate the character image.

10. The generation method according to claim 9, wherein the step of performing the character segmentation on the candidate character image, wherein the image type of the candidate character image indicates the character image, to generate the character image further comprises:

performing a skew correction on the character string image.

11. The generation method according to claim 9, wherein the step of generating the access point identifier and the empty password of the wireless access point according to the recognition result comprises:

determining access point identifier prompt information in the recognition result; and determining the access point identifier of the wireless access point according to the recognition result of the character image, wherein recognition result of the character image is in a same character string image as the character image indicating the access point identifier prompt information.

12. The generation method according to claim 11, wherein the step of determining the access point identifier of the wireless access point according to the recognition result of the character image, wherein the recognition result of the character image is in the same character string image as the character image indicating the access point identifier prompt information comprises:

determining the recognition result of the character image, wherein the recognition result of the character image is in the same character string image as the character image indicating the access point identifier prompt information as a candidate access point identifier of the wireless access point;

determining, in an access point identifier set, an access point identifier matching the candidate access point identifier; and determining the access point identifier matching the candidate access point identifier as the access point identifier of the wireless access point.

13. The generation method according to claim 9, wherein the step of generating the access point identifier and the empty password of the wireless access point according to the recognition result comprises:
- determining password prompt information in the recognition result; and
- determining the recognition result of the character image, wherein the recognition result of the character image is in the same character string image as the character image indicating the password prompt information as the empty password of the wireless access point.

14. An electronic device, comprising:
one or more processors; and
a storage apparatus, storing one or more programs, wherein
the one or more programs, when executed by the one or more processors, causes the one or more processors to implement the method according to claim 1.

15. A non-transitory computer readable medium, storing a computer program, wherein the computer program, when executed by a processor, causes the processor to implement the method according to claim 1.

\* \* \* \* \*